Aug. 30, 1960     S. F. WIGGINTON     2,950,546
BRUSH TOOL
Filed Feb. 16, 1955     2 Sheets-Sheet 1
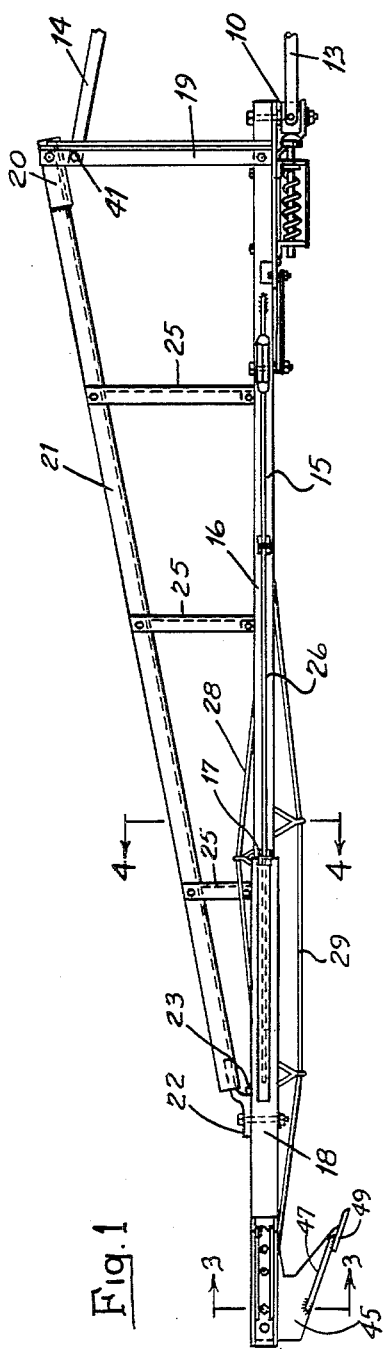
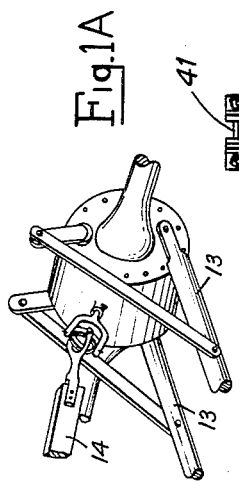
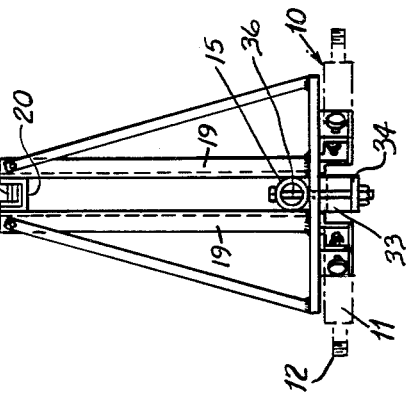
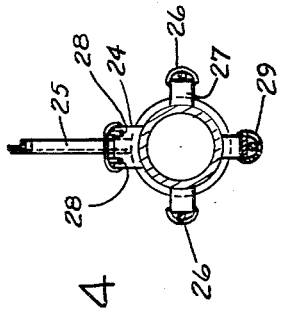
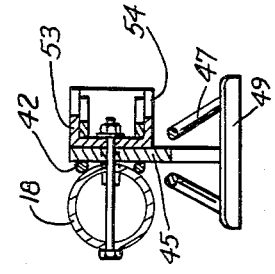
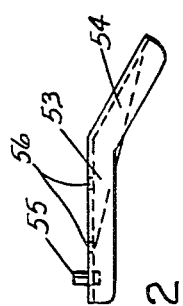
INVENTOR.
SCOTT F. WIGGINTON
BY
ATTORNEY Aug. 30, 1960 S. F. WIGGINTON 2,950,546
BRUSH TOOL
Filed Feb. 16, 1955 2 Sheets-Sheet 2
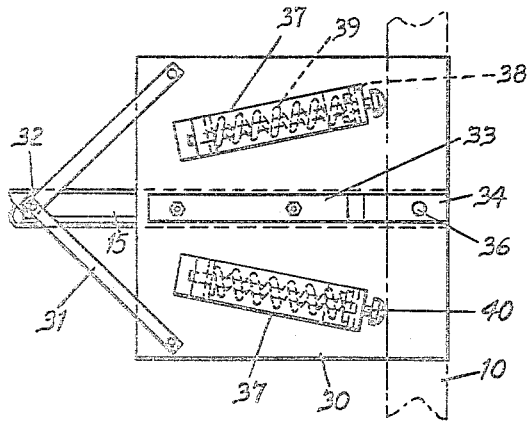
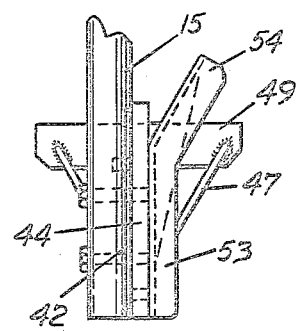
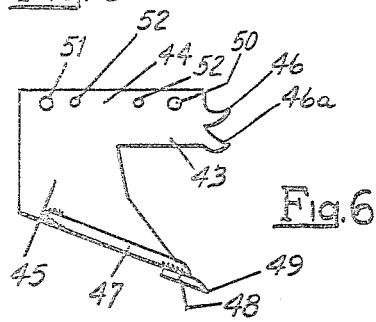
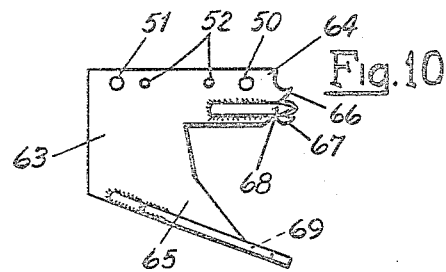
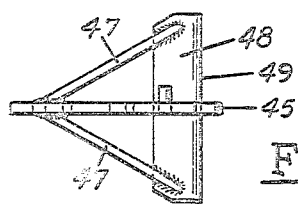
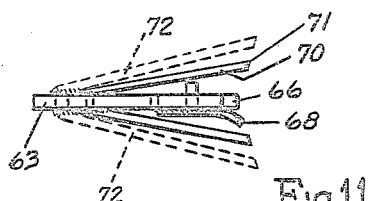
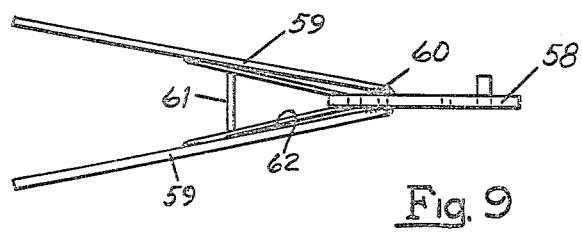
INVENTOR.
SCOTT F. WIGGINTON
BY
ATTORNEY

United States Patent Office 2,950,546
Patented Aug. 30, 1960

2,950,546

BRUSH TOOL

Scott F. Wigginton, R.D. 4, Cambridge, Ohio

Filed Feb. 16, 1955, Ser. No. 488,563

11 Claims. (Cl. 37—2)

The present invention relates to a brush tool and more particularly and specifically to a tractor carried and operated tool for clearing and removing trees and brush.

It is a primary object of the present invention to provide a tool for engaging small trees and brush for the purpose of removing them from the earth by controlled actuation of the tool from a tractor mounting the tool.

Another object of the present invention is to provide a tool having means for engaging tree and brush roots below the surface of the ground for the purpose of severing and lifting the roots to uproot the tree or brush to facilitate its being pulled from the ground, and a tool adaptable to engage a tree or brush at a spaced distance upwardly from the ground to forcefully pull the tree or brush out of the ground through the controlled actuation of the tool from a tractor on which it is mounted.

A further object of the present invention lies in the provision of a tree and brush engaging tool which is adapted to be mounted on the draw bar assembly of a standard tractor construction to permit the raising and lowering of the tool relative to the ground through the usual hydraulic control means associated with a tractor draw bar, and tool capable of drawing or pulling brush or trees from the earth under force imparted with forward or rearward movement of the tractor.

Still a further object of this invention is the provision of a brush and tree removal tool which is adapted for attachment to a standard draw bar assembly of a tractor to provide a rigid extension of the draw bar in a vertical plane and which permits horizontal movement of the tool relative to and independent of the tractor draw bar assembly.

Still another object of this invention lies in the provision of a tree and brush removing tool which includes a semi-flexible and sturdy boom construction adapted at one end for attachment to a tractor draw bar assembly and being provided at its extended end with a brush or tree engaging attachment capable of securely grasping and severing tree and brush roots upon controlled movement of the boom from the tractor.

Yet another object of this invention is the provision of new and unique brush and tree attachments for associated utilization with the aforedescribed boom construction for the purpose of removing trees and brush from the earth.

A still further object of this invention is the provision of a tree and brush removal tool of the type described provided with means for quickly and easily securing the tool in an extended position from a standard tractor draw bar assembly.

Still another object of this invention resides in the provision of a brush and tree removal tool of the type described which is of a novel and unique construction, inexpensive in manufacture and durable and long-lasting in use.

Still other objects and advantages of the present invention will become readily apparent to those skilled in the art when the following general statement and description are read in the light of the accompanying drawings.

The nature of the present invention may be stated in general terms as including an elongated boom having an angular brace extending throughout a portion of the length thereof, a hitch assembly at one extremity of the boom engageable with the draw bar of a tractor to horizontally, pivotally attach the the boom thereto, an adaptor assembly carried in the extended end of said boom, and brush or tree engaging attachments operatively secured to said boom adaptor assembly.

Referring now to the accompanying drawings in which like designations indicate similar parts throughout the several views:

Fig. 1 is a side elevation of the tool constituting the present invention.

Fig. 1A illustrates the attachment of the frame members 13 and the lift bar 14 to the tractor hydraulic lift mechanism.

Fig. 2 is an end view of the tool assembly taken from the right of Fig. 1.

Fig. 3 is a vertical section taken on line 3—3, Fig. 1.

Fig. 4 is a vertical section taken on line 4—4, Fig. 1.

Fig. 5 is a fragmentary bottom plan view of the tractor engaging end of said tool.

Fig. 6 is a side elevation of a hoe claw attachment for said tool.

Fig. 7 is a top plan view of Fig. 6.

Fig. 8 is a side elevation of a brush fork attachment for said tool.

Fig. 9 is a top plan view of Fig. 8.

Fig. 10 is a side elevation of a pulling claw attachment for said tool.

Fig. 11 is a top plan view of Fig. 10.

Fig. 12 is a side elevation of the tool guide assembly.

Fig. 13 is a top plan view of Fig. 12.

Fig. 14 is a top plan view of the tool guide and claw assembly on the tool.

The brush and tree engaging and removing tool constituting the present invention is adapted to be supported from and controlled by the draw bar and hydraulic lift mechanism of a standard tractor. The tool is removably secured to the draw bar and has a separable connection with the hydraulic lifting mechanism from which it derives its vertical actuation.

In the drawings a tractor draw bar is generally designated at 10 and is illustrated as a flat horizontal cross bar 11 supported by threaded members 12 at each end thereof from side frame members 13 extending forwardly and having connection with the tractor. A drag or link bar 14 is conventionally coupled universally to the hydraulic lift mechanism of the tractor and extends rearwardly for attachment to the tool in a manner to be hereinafter described. This arrangement is shown in Fig. 1A which illustrates a conventional tractor hydraulic lift mechanism.

Referring to Fig. 1, the tool constituting the present invention is shown as including an elongated tubular boom 15 composed of a forward section 16 telescoped as at 17 into the forward end of an enlarged tubular section 18 which constitutes the outermost end of the boom.

Immediately outward from the forwardmost end of the boom a pair of vertical brace members 19 are secured one to each side of the forward section 16 of the boom 15 to extend in parallel vertically thereabove where they are interconnected by a channel brace 20 at their upper remote ends (Fig. 2).

Secured to the channel brace member 20 is one end of an angular brace bar 21 which extends in longitudinal alignment above the boom 15 converging downwardly at its outer end toward the upper face of the boom where it is secured by means of a foot bracket 22 to the top of the boom with the rearward face of the foot bracket 22 abutting a lug 23 carried on the boom. The upper face of the boom is provided in spaced locations along its length intermediate the foot member 22 and vertical braces 19 with upstanding lug members 24 (Fig. 4), to which are secured the lower ends of a plurality of vertical strut members 25 the upper ends of which are secured to the angular brace bar 21. This foregoing construction provides a triangularly braced boom having substantial strength and rigidity throughout its length.

In addition to the brace bar 21 the boom is further strengthened longitudinally by means of two side truss rods 26, Figs. 1 and 4, which are secured at their remote ends front and rear to the sides of the tubular boom 15 and which are braced by horizontally projecting lugs 27 attached to the sides of the boom 15 at spaced points intermediate the ends of the truss rods. A pair of parallel top truss rods 28 is provided in bridging relationship between the upper faces of the two sections 16 and 18 of the boom, and a lower truss rod 29 likewise bridges the telescopic joint between the boom sections 16 and 18 along the length of the boom 15.

With particular reference to Figs. 1, 2, 3 and 5 there is illustrated a swing plate and hitch attachment at the forward end of the boom for securing the tool to the draw bar 10 of the tractor. This construction includes a flat rectangular plate 30 secured on its longitudinal center line horizontally to the underside of the forward boom section 16 from its rearward end forwardly and the rearward end of the plate is braced by a pair of arms 31 extending from the outermost rearward corners inwardly where they are secured as at 32 in a rearward position to the underside of the boom 15. The underside of the plate 30 carries on its longitudinal center line immediately beneath the boom 15 a hitch strap bracket 33 which is provided with a L-shaped extremity 34 at its forward end forming a socket between the foot of the bracket and the underside of the plate 30 immediately beneath the forward end of the boom 15 for the reception therein of the flat horizontal draw bar 10. The boom 15, the plate 30 and the foot portion of the L-shaped bracket are provided with vertical aligned holes 35 adapted to receive therethrough a hitch pin 36 which extends through a mating aligned hitch hole in the draw bar 10 thereby pivotally securing the tool to the draw bar of the tractor.

Associated with the underface of the plate 30 is a pair of housings 37 located one on either side of the longitudinal center line of the plate and at slightly divergent angles relative thereto. Each of the housings 37 contains a plunger 38 having a coil seating spring 39 within the housing, the plunger projecting transversely outward therefrom to terminate in a button head 40 which resiliently bears against the rearwardly disposed face of the draw bar 10. The spring pressed plungers 38, by being located one on either side of the longitudinal center of the boom form counterbalancing biases tending to maintain the boom in perpendicular extension relative to the draw bar 10. However the boom may be forcefully moved horizontally about the hitch pin 36 against the bias of one of said housed spring seated plungers to selectively position the extended end of the tool relative to a tree or brush to be engaged thereby.

The drag or link bar 14 extending rearwardly from the hydraulic mechanism of the tractor has its extended end secured pivotally on a horizontal pin 41 extending between the vertical braces 19 at a point adjacent their upper ends. This assembly permits the draw bar of the tool to be simultaneously raised and lowered relative to the tractor thereby controlling the relative horizontal position of the extended end of the tool.

The rearwardmost extended end of the boom 15 is provided on one side thereof with a pair of guide or bearing rods 42 which extend longitudinally for a spaced distance along the length of the boom from its rearward extended end in vertically spaced parallel relationship. The sidewardly disposed surfaces of the bearing rods 42 define a vertical plane and serve as a bearing support for the tool attachments to be hereinafter described and shown in Fig. 3.

The extended rearward end of the boom 15 intermediate the vertically spaced bearing rods on one side is provided with two longitudinally spaced dowel openings for the reception of dowel pins carried by the tool attachments and guide assembly associated therewith. Additionally two longitudinally spaced bolt holes are provided intermediate the dowel openings and extend through both sides of the boom 15.

Referring to Figs. 6 and 7 there is illustrated a hoe claw attachment for the aforedescribed brush tool which is adapted to be secured to the extended rearward end of the boom 15. The hoe claw attachment includes a claw plate 43 which is of flat and generally U-shaped configuration in a vertical plane having an upper forwardly extending arm portion 44 and a lower forwardly and downwardly extending arm portion 45 in vertical alignment beneath the upper arm 44 and having its forward end terminating slightly rearwardly from the foremost extremity of the upper arm 44.

The forward face of the upper arm 44 is provided with a pair of forwardly projecting arcuate cutting teeth 46 and 46a which are arranged in vertical alignment one above the other as is best seen in Fig. 6, each tooth having horizontally projecting chisel edges on each side thereof. The lower arm 45 of the claw plate is provided with a pair of brace arms 47 which are secured on opposite sides of the claw plate adjacent the rearward end of the lower arm 45, the brace arms extending at divergent angles forwardly along the length of the lower arm 45 to terminate at points spaced outwardly from the forward extremity of the lower arm 45. An elongated flat hoe blade 48 having a sharpened edge 49 is secured transversely between the forward extended ends of the brace arms 47 and is supported centrally by attachment to the lower edge of the foremost extremity of the lower arm 45 of the claw plate 43.

Located adjacent the foremost end of the upper arm 44 of the claw plate 43 is a horizontally projecting dowel pin 50, and located in horizontal alignment therewith at a point adjacent the rearward end of the upper arm 44 is a dowel opening 51. Intermediate the dowel 50 and the dowel opening 51 in spaced relationship are a pair of bolt holes 52 extending through the upper arm of the claw plate 43.

Referring to Figs. 12 and 13 there is illustrated a guide adaptor for assembly with the aforedescribed hoe claw attachment and the boom 15. The guide member includes an elongated channel 53 of U-shaped cross section in a vertical plane and having one end thereof turned outwardly to form an angular projection 54. A dowel 55 is secured adjacent the straight end of the channel and a pair of bolt holes 56 are formed therein intermediate the dowel and the angularly projecting extension 54.

In assemblying the guide member 53 and the hoe claw attachment with the extended end of the boom 15, the hoe claw attachment is positioned with the upper arm 44 longitudinally adjacent the extended end of the boom bridging the bearing rods 42, as best illustrated in Fig. 14, with the dowel 50 projecting into the dowel opening in the boom 15 and aligning the bolt holes 52 in the upper arm of the claw plate with the bolt holes in the boom 15. The guide member 53 is then located in juxtaposition with the upper arm 44 of the dowel 55 on the guide member extending through the dowel opening 51 in the claw plate and into the second dowel opening provided in the boom 15. When so located the bolt holes 56 in the guide member 53 will align with the bolt holes 52 in the claw plate and the bolt holes in the boom 15. Then bolts are secured through the aligned bolt holes tightly securing the claw plate and the guide member to the boom.

When the claw plate and guide member have been assembled to the boom 15 in the manner aforedescribed a forwardly disposed hoeing tool is provided on the extended end of the boom with the hoe member 48 in a horizontal position at a spaced distance beneath the boom and with the tree or brush engaging teeth 46 and 46a located adjacent the boom and provided by means of the angular guide projection 54 with a tree or brush engaging guide for directing the tree or brush inwardly into engagement with the teeth 46 and 46a upon forward movement of the tractor and boom. Thus by lowering the extended end of the boom through the medium of the tractor hydraulic mechanism the hoe plate is brought into engagement with the ground to sever brush or small tree roots at ground level while the teeth 46 and 46a are engaging the trunk or stem of the brush or tree above ground level to exert a pulling force thereon.

In Figs. 8 and 9 of the drawings there is illustrated a brush fork which may be utilized to rake up piles of brush and shrub through movement of the tractor and control of the fork vertically by means of the hydraulic mechanism of the tractor. This brush fork includes a flat vertical attachment plate 58 having corresponding dowel, dowel openings and bolt openings therein with those aforedescribed relative to the claw plate 44 and a pair of elongated fork arms 59 which are secured as at 60 on opposite sides of the rearward end of the attachment plate 58 to extend at divergent angles rearwardly from the plate in substantially a similar horizontal plane therewith.

Associated with the fork arms 59 of the brush fork is an intermediate brace 61 which is secured between the arms 59 intermediate their length lending lateral rigidity to the arms, and a pair of buttress-type brace arms 62 are secured one to each of the fork arms 59 intermediate their length with the second ends of the braces secured on opposite faces of the vertical attachment plate 58 at points above the attachment of the fork arms 59 thereto.

The brush fork attachment illustrated in Figs. 8 and 9 is utilized for the purpose of piling and transporting loose or uprooted brush and debris by engagement of the fork arms therewith and movement of the tool through movement of the tractor either forwardly or rearwardly. The angular fork arms 59 will serve as a rake for the purpose of controlling movement of the brush in accordance with the movement of the tractor to perform the desired raking functions.

With reference to Figs. 10 and 11 of the drawings there is shown a tree or brush pulling claw attachment which is similar in many respects to the hoe claw attachment previously described and illustrated in Figs. 6 and 7. The pulling claw attachment includes a flat substantially U-shaped claw plate 63 substantially identical to plate 43 of the hoe attachment which has an upper forwardly extending arm portion 64 and a lower forwardly and downwardly extending arm portion 65 with the forward extremity of the lower arm 65 terminating substantially in alignment below the forward end of the upper arm 64. The forward extremity of the upper arm 64 is provided with a pair of forwardly projecting arcuate teeth 66 and 67 substantially identical to the teeth 46 and 46a of the hoe claw attachment, and the upper arm is provided along its length adjacent its upper edge with the dowel 50, dowel opening 51 and bolt holes 52 previously shown and described relative to the hoe claw attachment.

In addition to the forwardly projecting teeth 66 and 67 the forward extremity of the upper arm 64 of the claw plate 63 is additionally provided with a third tooth 68 with a chisel blade projecting angularly, horizontally outward from the side of the plate in a vertical plane substantially intermediate the teeth 66 and 67. The tooth 68 is welded or otherwise secured to the flat vertical side of the claw plate rearwardly from the forward extremity of the upper arm 64.

The forward extremity of the lower arm portion 65 of the claw plate 63 presents a forwardly projecting tooth 69 substantially directly below the teeth 66 and 67 on the upper arm, and the lower arm portion is additionally provided, Fig. 11, with a pair of outwardly and forwardly diverging side teeth or tine members 70 which are provided with chisel points 71 on their forward extended ends. These forwardly diverging teeth 70 project for a spaced distance beyond the forward extended end of the lower arm portion 65 of the claw plate and their extended ends are in equally spaced relationship laterally on either side of the lower tooth 69.

It is further illustrated in Fig. 11 of the drawings that a second pair of forwardly diverging teeth or tines 72 may be affixed to the claw plate to lie outwardly on either side of the first pair of teeth 70 as is shown in dotted line.

In the use of the pulling claw illustrated in Figs. 10 and 11 there is provided a V-shaped wedge between the teeth 66, 67 and 68 on the forward extremity of the upper arm 64 for receiving and gripping small trunks and brush at a spaced distance above ground level while the lower tooth 69 together with the diverging side teeth 70 serve to penetrate the ground and grip the roots of brush and trees, the side teeth serving to center the tool about the lower trunk and root, to exert a leverage together with the upper teeth for the purpose of pulling a tree or brush out of the ground.

The additional side teeth 72 in the lower portion of the claw are desirable for extremely heavy duty work and for removal of trees and brush of large diameter to insure maximum penetrating and clawing efficiency.

The pulling claw construction illustrated in Figs. 10 and 11 and heretofore described is secured to the extended end of the tool boom in the same manner as heretofore described relative to the hoe claw plate and can be associated with the guide adaptor 53 previously described.

Thus, from the foregoing descriptions, it is seen that a brush and tree pulling tool has been provided which is readily adaptable for attachment to the vertically movable draw bar of a standard tractor to present one of several functional brush and tree removing tools in an extended position relative to the tractor by means of a boom secured to the draw bar of the tractor for vertical movement therewith but which boom is capable of independent horizontal movement relative to the draw bar of the tractor. Such a construction provides a tree and brush removal tool which has extreme advantages functionally over prior constructions in that horizontal adjustment of the tool relative to the tractor can be simply and easily accomplished manually against the bias of the resilient means normally retaining the tool in a fixed angular position without any loss of vertical rigidity and fore and aft leverage of the tool.

Further, the foregoing description and illustrations make it apparent that the new and improved tool herein disclosed accomplishes all of those advantages and objects heretofore set forth.

Accordingly, having described the new and improved construction of and the new and useful results obtained by my invention, what I desire to claim is:

1. A tree and brush pulling tool for attachment to tractors including, in combination, a power lift means mounted on the tractor including a draw bar extending transverse the rear end of the tractor, an elongated boom having a forward end quickly detachably connected to the draw bar whereby the boom in its entirety is elevated and lowered when the draw bar is elevated and lowered, the connection between the boom and the draw bar including a vertical hitch pin providing a pivot about which the boom can swing in a horizontal plane, spring means provided on opposed sides of said boom adjacent the forward end thereof, said spring means engaging the boom in opposed bias and normally retaining the boom in fixed horizontal angularity to the draw bar, and a tree and brush engaging tool carried on the remote rearward end of the boom.

2. A tree and brush pulling tool for attachment to tractors including, in combination, a power lift means mounted on the tractor including a draw bar, an elongated boom having a rectangular plate secured to the under side of its forward end, a bracket carried by the under side of the plate and forming a pocket for telescopically receiving the tractor draw bar, a hitch pin extending through the forward end of the boom and the draw bar within the pocket, said connection securing the boom and the draw bar together whereby the entire length of the boom is elevated and lowered when the draw bar is elevated and lowered, said hitch pin providing a pivot for the inner end of the boom which permits the boom to swing in a horizontal plane, and tool attachment means on the extended rearward end of the boom.

3. A construction as defined in claim 2 wherein, resilient means is mounted on and carried by the under side of the plate at each side of the boom and engage the draw bar in opposed bias to normally retain the boom in fixed horizontal angularity relative to the draw bar.

4. A construction as defined in claim 2 wherein, a pair of housings are carried by the under side of the plate, one housing being at each side of the boom and extending toward the rear end of the boom at an angle outwardly from the boom, resilient means in each housing, a plunger head exterior of each housing and connected to the resilient means therein, said plunger heads normally having engagement with the rearwardly disposed face of the draw bar and exerting opposed bias to normally retain the boom in fixed horizontal angularity relative to the draw bar.

5. A construction as defined in claim 2 including an upright extending vertically from the forward end of the boom, and a link bar having an inner end universally connected to the tractor and an outer end horizontally pivotally connected to the upper end of the upright.

6. A construction as defined in claim 2 including an upright extending vertically from the forward end of the boom, a link bar having an inner end universally connected to the tractor and an outer end horizontally pivotally connected to the upper end of the upright, and a brace bar interconnecting the upper end of the upright and the boom at a point adjacent the outer end thereof.

7. A construction as defined in claim 1 wherein, means are provided on one side face of the boom adjacent the rearward end thereof to permit a tool to be detachably secured to one side of the rearward end of the boom.

8. A tree and brush engaging tool for attachment to tractors having power lift means comprising a boom having a forward end attached to the tractor lift means, a flat and substantially U-shaped plate secured to the rearward end of the boom, said plate having upper and lower legs, the forward end of the upper leg being provided with a pair of vertically aligned arcuate teeth, and the forward end of the lower leg being provided with a tool-edged hoe plate extending transverse the end of the leg.

9. A tree and brush engaging tool for attachment to tractors having power lift means comprising a boom having a forward end attached to the tractor lift means, a flat and substantially U-shaped plate secured to the rearward end of the boom, said plate having upper and lower legs, the forward end of the upper leg being provided with a pair of vertically aligned arcuate teeth, said teeth projecting forwardly of the plate, a third tooth projecting angularly from one side of the plate, and the forward end of the lower plate leg being provided with a plurality of angular teeth spaced apart laterally on each side of the plate leg.

10. A construction as defined in claim 8 wherein, the boom is secured to the tractor lift means for swinging movement in a horizontal plane.

11. A construction as defined in claim 9 wherein, the boom is secured to the tractor lift means for swinging movement in a horizontal plane.

References Cited in the file of this patent

UNITED STATES PATENTS

| | | |
|---|---|---|
| 854,196 | Brown | May 21, 1907 |
| 1,676,040 | Meunier | July 3, 1928 |
| 2,302,801 | Powelson | Nov. 24, 1942 |
| 2,322,342 | Bunn | June 22, 1943 |
| 2,506,759 | Wommer | May 9, 1950 |
| 2,633,880 | Mattson | Apr. 7, 1953 |
| 2,701,591 | Kissner et al. | Feb. 8, 1955 |
| 2,730,972 | Hamran | Jan. 17, 1956 |
| 2,735,198 | Zogg et al. | Feb. 21, 1956 |
| 2,741,041 | Wilson | Apr. 10, 1956 |